May 22, 1962 D. R. CAMPBELL 3,035,696
PRODUCE GRADING MACHINE
Filed March 27, 1958 3 Sheets-Sheet 1

David R. Campbell
INVENTOR.

May 22, 1962 D. R. CAMPBELL 3,035,696
PRODUCE GRADING MACHINE
Filed March 27, 1958 3 Sheets-Sheet 2
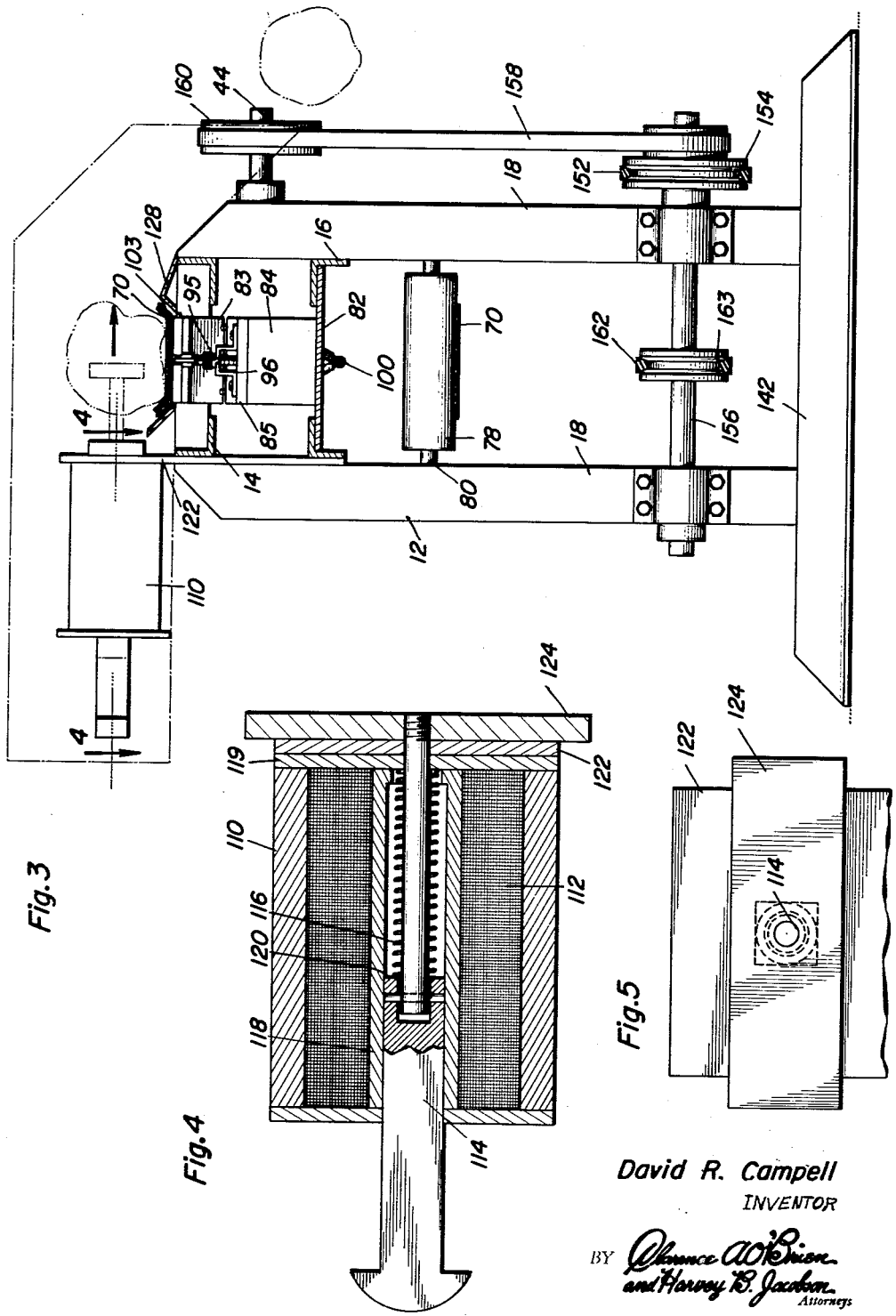
David R. Campell
INVENTOR May 22, 1962 D. R. CAMPBELL 3,035,696
PRODUCE GRADING MACHINE
Filed March 27, 1958 3 Sheets-Sheet 3
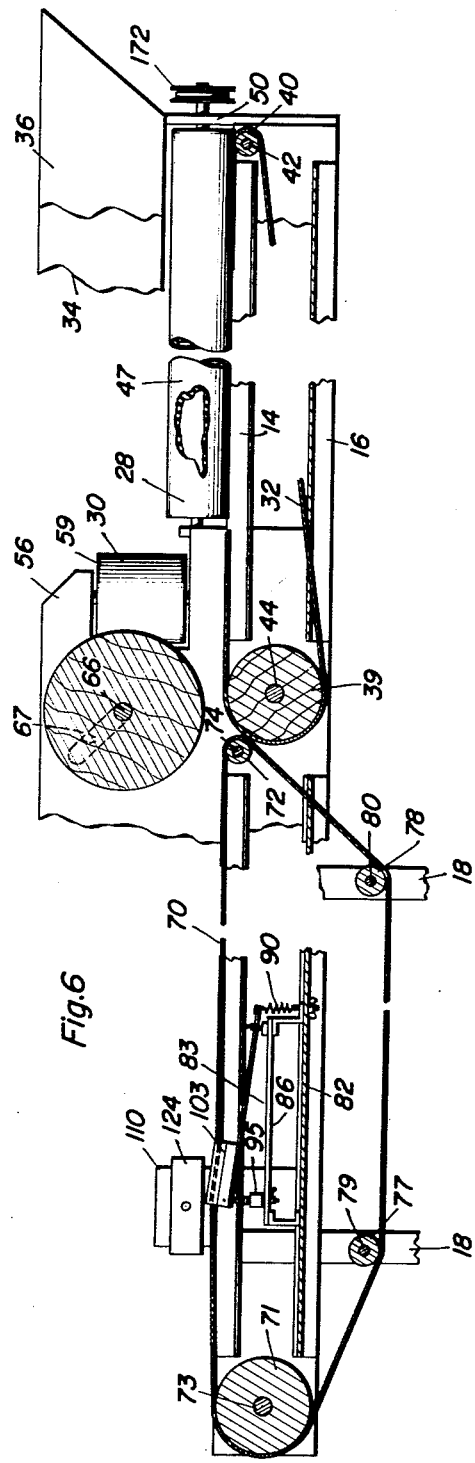
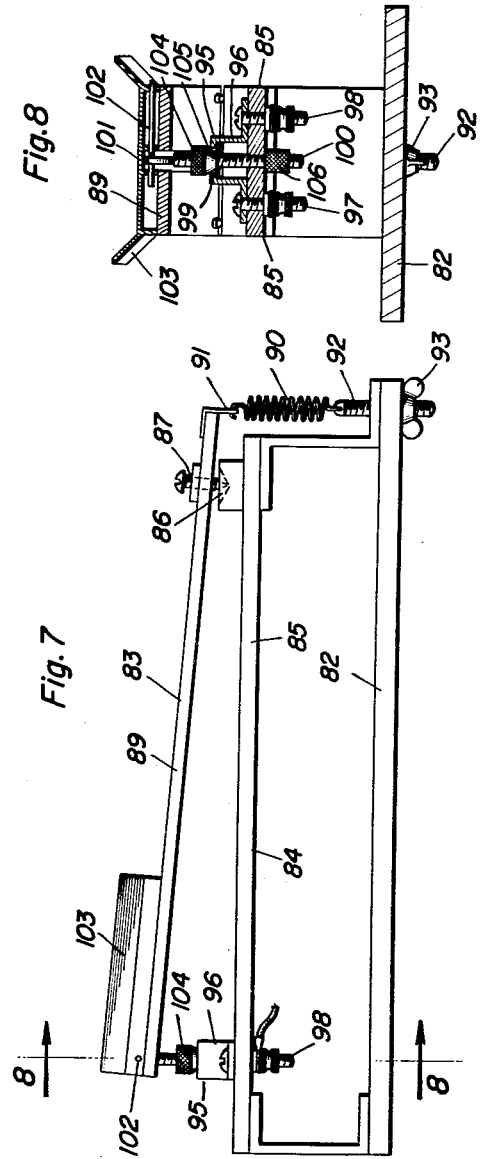
David R. Campbell
INVENTOR.

United States Patent Office 3,035,696
Patented May 22, 1962

3,035,696
PRODUCE GRADING MACHINE
David R. Campbell, 450 S. 11th East,
Salt Lake City, Utah
Filed Mar. 27, 1958, Ser. No. 724,308
7 Claims. (Cl. 209—121)

This invention relates to a grading machine for many types of produce, either fruit or vegetable.

During the last few years there has been a great increase in the demand for fruits and vegetables of high quality, special packing and in definite weight brackets. In the past this work has been very specialized and done mostly by hand. An object of this invention is to provide a machine for weighing the fruit and/or vegetables accurately, with speed, economy and a minimum of handling. Although this machine has special application for potatoes, it may be used for many types of fruits and vegetables.

A machine constructed in accordance with the invention has a receiving station that is established by a hopper provided with means to discharge a single article at a time. The receiving station has its bottom established by a conveyor whose discharge end is in registry with a main propelling conveyor for the fruits and vegetables. This main propelling conveyor has its upper run or flight passed over a series of special scales which select the fruits or vegetables above a preselected weight level and are adapted to discharge them into an adjacent container, on an adjacent belt or into some other convenient receptacle. Accordingly, the fruits or vegetables carried by the main conveyor are graded by weight with the fruits and vegetables that are so light as to fail to meet the requirements of any of the weighing stations, discharging from the end of the main conveyor and into a container or whatever the operator may wish to use for accumulating these small fruits and vegetables.

A further object of the invention is to provide a novel scales adapted to be operated by the weight of the fruits or vegetables passing thereover. Upon operation of one of the scales, a switch is closed thereby energizing an electric circuit with which the associated means for discharging the selected fruit or vegetable is operated.

One of the main features of the invention is its simplicity of construction, speed and accuracy and above all, the gentle handling of the fruit or vegetables to preventing bruising.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a transverse sectional view on enlarged scale and taken on the line 3—3 of FIGURE 1.

FIGURE 4 is an enlarged sectional view taken on the line 4—4 of FIGURE 3 and showing one of the solenoid motors by which to propel the fruit from the main conveyor and into one of the fruit collection stations.

FIGURE 5 is an end view of the solenoid motor in FIGURE 4.

FIGURE 6 is a sectional view on enlarged scale, parts being broken away and taken on the line 6—6 of FIGURE 2.

FIGURE 7 is a side elevational view of one of the scales of the invention.

FIGURE 8 is a sectional view taken on the line 8—8 of FIGURE 7.

Figure 2:
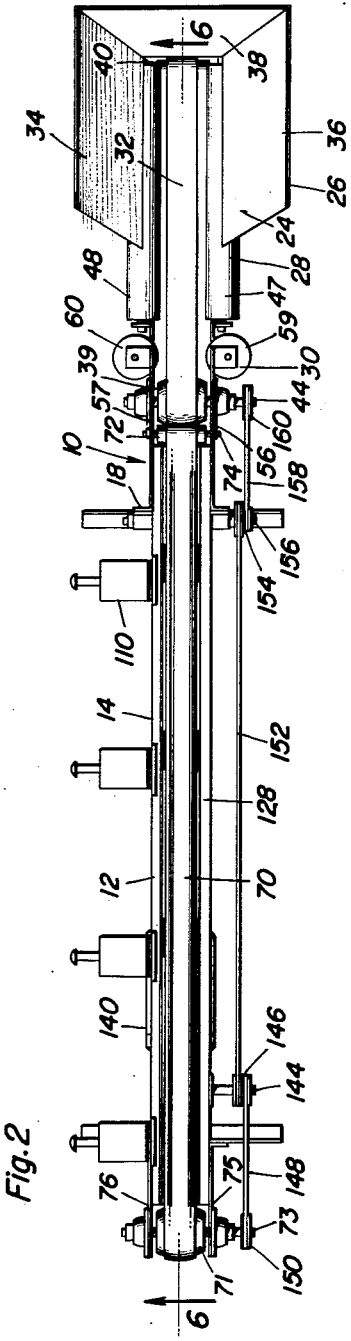
FIGURE 2 is a top view of the machine in FIGURE 1, a part of the machine shown in section to illustrate otherwise hidden detail.

In the accompanying drawings there is a machine 10 to sort, by weight, produce. The produce may be fruits or vegetables susceptible to sorting by the system of operation of the machine. The machine has a main frame 12 constructed of an upper generally rectangular sub-frame 14, an intermediate sub-frame 16 parallel to sub-frame 14 and a plurality of legs 18. The structure of the main frame can be varied, however, standard structural members are used, such as angle iron, channels, etc. The frame supports the parts for two main sections 20 and 22 of the machine. Section 20 has an article receiving station 24 established by a hopper 26 and two pairs 28 and 30 of rollers plus an endless conveyor 32. The hopper has two sides 34 and 36 that are angled inwardly and downwardly, and a rear wall 38 that is also angled inwardly and downwardly with respect to the bottom of the hopper. The bottom of the hopper is established by the endless conveyors, preferably a belt whose ends are entrained about rollers 39 and 40 that are carried on shafts 42 and 44. The shafts extend through bearings that are formed in or carried by the upper sub-frames. Sides 34 and 36 of hopper 26 are vertically spaced from the upper sub-frame 14 and are held in place by supports 45 separably carried by the upper sub-frame 14. Therefore, the hopper sides and rear wall 38 to which the sides are secured, can be removed and replaced by a smaller or larger hopper body. In the space 46 between the lower edges of the sides of the hopper and the upper sub-frame, rollers 47 and 48 that constitute the pair 28 of rollers, are mounted for rotation. These are driven rollers, mounted for rotation in bearings formed in (as by having an aperture) brackets 50 and 52 for each roller. Bracket 50 is attached to and rises from a structural member on the two sub-frames while bracket 52 protrudes laterally from side plate 56 that is also secured to the sub-frames 14 and 16. A similar side plate 57 is on the opposite side of the frame of the machine from the side on which plate 56 is fixed.

A pair of notches 58 are in the two plates 56 and 57 and they open toward the ends and are spaced from the inner ends of rollers 47 and 48. These notches accommodate rollers 59 and 60 of the pair of rollers 30 which are free turning rollers. The bearings for the spindles of rollers 59 and 60 are carried by or formed in lateral mounting brackets 63 at the top and bottom of each notch 58 and on plates 57 and 56. The final free turning roller 65 in section 20 has a spindle 66 extending from both of its ends and disposed in a pair of slots 67 in plates 56 and 57. These slots are angled with respect to the vertical and horizontal directions so that the roller 65, which like rollers 59 and 60 may be made of wood, tend to ride to one end of each slot due to the camming action of the slots. A part of roller 65 (see FIGURE 6) is located between the rollers 59 and 60, and all of the rollers function to assure that the produce is delivered from section 20 singly. In the original machine the three wooden rollers were made of that material and rollers 47 and 48 were rubber coated. However, it is within the purview of the invention to use other types of rollers for the protection of the produce.

Section 22 of machine 10 begins where section 20 ends. The main conveyor 70 of section 22 is endless and is preferably an endless belt. It is entrained over end rollers 71 and 72 that are carried by their shafts 73 and 74 in bearings formed in or carried by end plates 75 and 76 at one end of the frame of the machine and carried by or formed in plates 56 and 57 at the other end of the frame. Lower idler rollers (FIGURE 6) 77 and 78 are mounted for rotation on their shafts 79 and 80, and these are rotatively supported by two of the legs 18. One or both of the rollers 77 and 78 may be vertically adjustable. The discharge end of conveyor 32 is in alignment with the inlet end of conveyor 70, and roller 65 is located above the confronting ends of these conveyors.

Sub-frame 16 has a mounting plate 82 welded or otherwise fixed to it in order to support a group of scales 83 thereon. There are four illustrated scales, each identical in construction. However, this number can be reduced or increased depending on the produce for which the machine is specifically designed and depending on the desires of the manufacturer. Scale 83 (FIGURES 7 and 8) consist of a substantially U-shaped support 84 whose upper member 85 has a seat 86 carried by it. The seat is formed by a block that has an upwardly opening recess. A fulcrum is established by bolt 87 which is secured to one end of beam 89, as by being threaded through a nut welded thereon. It is preferred that the extremity of the bolt 87 be pointed to reduce friction. Beam 89 is held biased in one direction by spring 90 whose upper end is attached to a mounting bracket 91 fixed to beam 89 on one side of the fulcrum. The other end of spring 90 is attached to an adjusting screw 92 carried by support 84. The support of adjusting bolt 92 may be obtained by having the adjusting bolt passed through a hole in the support and by having a nut 93 on the shank of the bolt and bearing against the bottom of plate 82. In this way the tension of spring 90 is adjustable and this adjusts the required weight of the article on beam 83 to pivotally operate the beam sufficiently to close switch 95.

Switch 95 is at the front part of beam 89. It consists of a fixed contact 96 carried by the frame member 85. Two binding posts 97 and 98 are attached to fixed contacts 96 and they have circuit wires thereon. Fixed contacts 96 are metallic members having a beveled wall opening 99 between. Threaded rod 100 is secured to the front end of beam 89 by having an eye 101 at its upper end through which binding pin 102 is passed. This binding pin is passed through a group of apertures in a generally U-shaped, upwardly opening saddle 103 that is fixed to the top part of beam 83. Nut 104 is adjustably disposed on the shank of the threaded rod 100 and has a tapered contact surface 105 thereon adapted to be brought into engagement with the tapered seat 99 upon sufficient depression of beam 89. Nut 106 on threaded rod 100 beneath member 85, is adapted to contact the lower surface of the member 85 and establish an upward limit to the travel of beam 89. The lower limit of the travel of the beam 89 is established when the contact formed by nut 104 and the tapered seat 99, engage each other. This also bridges the space between the two parts of the metallic members 96 that constitutes the fixed contact and closes an electrical circuit.

The upper flight of the main conveyor 70 seats in the generally U-shaped and upwardly opening saddle 103 and the scale is adjusted so that the weight of the upper flight is insufficient to operate the scale. However, when an additional weight of sufficient amount is located above the upwardly opening saddle 103, the beam 89 is depressed closing the electric circuit that was mentioned previously. A source of electrical potential is connected in this circuit as is the solenoid motor 110. This solenoid motor is actually a solenoid having a coil 112 and a plunger 114 that is biased by spring 116 to a rest position. The spring is located in the solenoid core sleeve 118 (FIGURE 4), reacting on a stationary end wall 119 and on a shoulder 120 on the plunger 114. Mounting bracket 122 is attached to a side of the frame of the machine and has an upper part which projects above the general plane of the upper flight of conveyor 70. A pusher plate 124 is secured to the outer extremity of plunger 114 so that when the solenoid 110 is energized it functions as a motor to propel the article from the main conveyor 70. The article is moved over the inclined surface or chute 123 along one upper edge of the upper sub-frame 14 and down a chute 128 for deposit into a container. Each of the solenoid motors operate in the same way and they each may be adjusted to select any weight of article that is being passed over the upwardly opening saddles of the scales.

Figure 1:
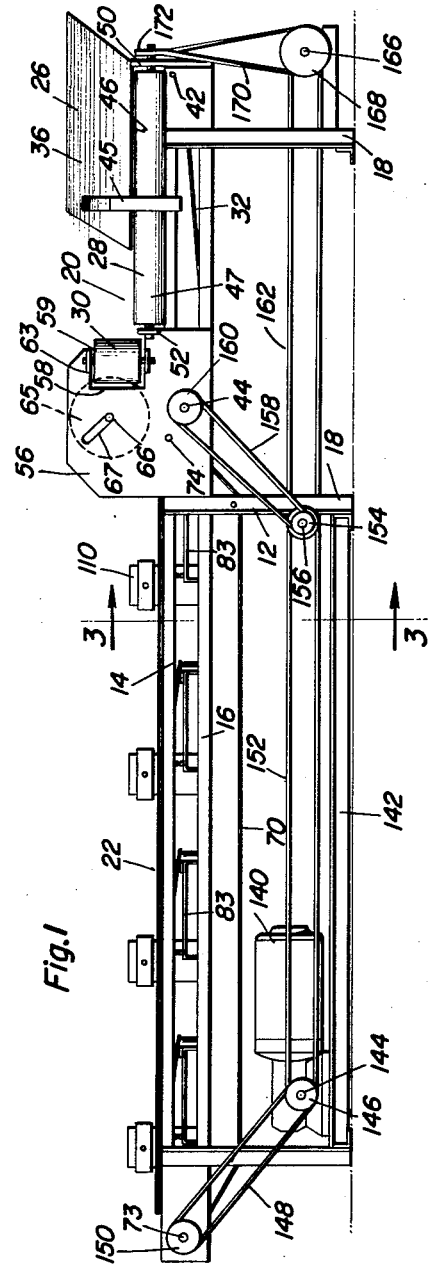
FIGURE 1 is a side elevational view of a machine constructed in accordance with the invention.

The drives for the various parts of the machine can be arranged in several ways. A preferred arrangement is seen best in FIGURES 1 and 2 and consists of a main electric motor 140 carried by a platform 142 at the bottom of the main frame of the machine. After speed reducing shaft 144 protruding from the speed reducer is rotated, a double pulley 146 on shaft 144 is rotated therewith. One belt 148 is entrained around a part of pulley 146 and around a pulley 150 on shaft 73. This provides propulsion for the main conveyor 70. The other part of double pulley 146 has a belt 152 entrained around it and also around one part of a double pulley 154 on transverse shaft 156. This transverse shaft is carried in bearings that may be attached to a pair of legs 18 or otherwise secured to the frame of the machine. Another part of the double pulley 154 has a belt 158 entrained around it and entrained around pulley 160 fixed to shaft 44. This provides propulsion for the conveyor 32. Endless belt 162 is entrained around a pulley 163 on shaft 156 and around another pulley on shaft 166. Shaft 166 is supported by bearings at the lower part of section 20 and has two additional pulleys 168 thereon. Each of these additional pulleys has a belt 170 entrained around it and around an upper pulley 172. Pulleys 168 and 172 of FIGURE 1 establish a drive connection with the spindle of roller 47 and an identical structure and assembly (unshown) is driven from the torque of shaft 166 in order to operate the roller 48.

The operation of this machine has been described along with the structure thereof. It is understood that various changes may be made from the illustrated embodiment of the invention inasmuch as the illustrations are only for the purpose of exemplifying the principles of the invention. Accordingly, all changes that fall within the scope of the claims may be made.

What is claimed as new is as follows:

1. A machine to grade produce by weight, said machine comprising a produce receiving section, means in said section to align and discharge the produce singly from one end thereof, a sorting section having a conveyor provided with an inlet end and a discharge end, said inlet end in registry with the discharge end of said produce receiving section, said conveyor being flexible, at least one scale located beneath said flexible conveyor and having a beam over which said conveyor passes, said beam adapted to be depressed by the combined weight of produce and conveyor when located immediately above said beam, means responsive to said depression of said beam for propelling the produce off said conveyor, said produce receiving section including a hopper, a conveyor constituting the bottom of said hopper and in longitudinal registry with said inlet of said first mentioned conveyor, and a plurality of rollers arranged alongside of said receiving section hopper to aid in feeding the produce from said produce receiving section, upstanding plates alongside of the confronting ends of said conveyors, at least one roller disposed between and carried rotationally by said plates and extending across and above said confronting ends of said conveyors and being also mounted for movement toward and away from said conveyors wherein the produce articles are each engaged by said roller so as to be moved singly from the receiving section to the grading section.

2. The machine of claim 1 wherein there are additional rollers carried by said upstanding plates, disposed on opposite sides of said conveyors and located between the first mentioned rollers and the roller that is above the confronting ends of said conveyors.

3. In a fruit grading by weight machine, a main frame having a produce receiving section, said produce receiving section having a hopper and a horizontally disposed conveyor in the bottom thereof and including means for aligning and discharging produce articles singly therefrom, side rollers alongside of said conveyor for regulating the number of produce articles positioned thereon, additional side rollers in advance of the first mentioned side rollers for aligning said article, said first mentioned side rollers mounted for rotation about parallel axes, said additional rollers mounted for rotation about axes in planes which intersect the planes containing the first mentioned axes, a sorting section having an endless conveyor provided with an upper flight, said last mentioned endless conveyor having an inlet end in registry with the discharge end of the first mentioned conveyor, and means for sorting according to weight the produce carried by the main conveyor.

4. In a fruit grading by weight machine, a main frame having a produce receiving section, said produce receiving section having a hopper and a horizontally disposed conveyor in the bottom thereof and including means for aligning and discharging produce articles singly therefrom, side rollers alongside of said conveyor for regulating the number of produce articles positioned thereon, additional side rollers in advance of the first mentioned side rollers for aligning said articles, said first mentioned side rollers mounted for rotation about parallel axes, said additional rollers mounted for rotation about axes in planes which intersect the planes containing the first mentioned axes, a sorting section having an endless conveyor provided with an upper flight, said last mentioned endless conveyor having an inlet end in registry with the discharge end of the first mentioned conveyor, and means for sorting according to weight the produce carried by the main conveyor, said sorting means including scales that have beams located beneath said upper flight of said conveyor, upwardly opening saddles on said beams and within which said flight is disposed, and electrical circuits having switches, said switches operatively connected with said beams of said scales enclosed by depression of said beams beyond a preselected limit, and electrically operated solenoid motors having pushers at the side of said main conveyor to push the produce therefrom in response to the closing of said circuit by the closing of said switches.

5. In a fruit grading by weight machine, a main frame having a produce receiving section, said produce receiving section having a hopper and a horizontally disposed conveyor in the bottom thereof and including means for aligning and discharging produce articles singly therefrom, side rollers alongside of said conveyor for regulating the number of produce articles positioned thereon, additional side rollers in advance of the first mentioned side rollers for aligning said articles, said first mentioned side rollers mounted for rotation about parallel axes, said additional rollers mounted for rotation about axes in planes which intersect the planes containing the first mentioned axes, a sorting section having an endless conveyor provided with an upper flight, said last mentioned endless conveyor having an inlet end in registry with the discharge end of the first mentioned conveyor, and means for sorting according to weight the produce carried by the main conveyor, said sorting means including scales that have beams located beneath said upper flight of said conveyor, upwardly opening saddles on said beams and within which said flight is disposed, and electrical circuits having switches, said switches operatively connected with said beams of said scales enclosed by depression of said beams beyond a preselected limit, and electrically operated solenoid motors having pushers at the side of said main conveyor to push the produce therefrom in response to the closing of said circuit by the closing of said switches, each switch having a plurality of contacts, and means for adjusting said contacts to require further travel of said beams or lesser travel of said beams to close said switches.

6. The machine of claim 4 wherein there are adjustably mounted resilient means attached to each of said beams and opposing the movement of said beams in one direction.

7. A machine to grade produce by weight, said machine comprising a produce receiving section, means in said section to align and discharge the produce singly from one end thereof, said produce receiving station including a hopper, said alignment and discharge means comprising a conveyor having an inlet end communicated with said hopper and an outlet end, a sorting section having a conveyor provided with an inlet end and a discharge end, said inlet end in registry with the discharge end of said produce receiving section conveyor, said conveyor being flexible, at least one scale located beneath said flexible conveyor and having a beam over which said conveyor passes, said beam adapted to be depressed by the combined weight of produce and conveyor when located immediately above said beam, and means responsive to said depression of said beam for propelling the produce off said conveyor, said discharge and alignment means comprising a horizontally disposed conveyor with two pairs of rollers disposed therealong, the rollers of each pair of rollers embracing said conveyor and being journaled for rotation about parallel axes mutually perpendicular to the axes of rotation of the other pair of rollers.

References Cited in the file of this patent

UNITED STATES PATENTS

| | | |
|---|---|---|
| 589,141 | Rice | Aug. 31, 1897 |
| 1,048,963 | Hart | Dec. 31, 1912 |
| 1,169,467 | Cutler | Jan. 25, 1916 |
| 1,537,123 | Leopold | May 12, 1925 |
| 1,625,653 | Haeger | Apr. 19, 1927 |
| 1,651,622 | Norman | Dec. 6, 1927 |
| 2,065,888 | Du Brul et al. | Dec. 29, 1936 |
| 2,138,475 | Hilton | Nov. 29, 1938 |
| 2,235,725 | Nordquist | Mar. 18, 1941 |
| 2,364,832 | Weckerly | Dec. 12, 1944 |
| 2,579,602 | Niederer et al. | Dec. 25, 1951 |
| 2,702,628 | Lucius et al. | Feb. 22, 1955 |

FOREIGN PATENTS

| | | |
|---|---|---|
| 115,363 | Austria | Dec. 10, 1929 |